(12) United States Patent
Lee

(10) Patent No.: US 7,221,154 B2
(45) Date of Patent: May 22, 2007

(54) INDUCTIVE POSITION SENSOR WITH COMMON MODE CORRECTIVE WINDING AND SIMPLIFIED SIGNAL CONDITIONING

(75) Inventor: Joong K. Lee, Chatham (CA)

(73) Assignee: KSR International Co., Ontario (CA)

( * ) Notice: Subject to any disclaimer, the term of this patent is extended or adjusted under 35 U.S.C. 154(b) by 0 days.

(21) Appl. No.: 11/399,150

(22) Filed: Apr. 6, 2006

(65) Prior Publication Data

US 2006/0233123 A1    Oct. 19, 2006

Related U.S. Application Data

(60) Provisional application No. 60/669,145, filed on Apr. 7, 2005.

(51) Int. Cl.
G01B 7/30 (2006.01)
G01B 7/00 (2006.01)

(52) U.S. Cl. .............................. 324/207.25; 324/207.11

(58) Field of Classification Search ........... 324/207.25, 324/207.11
See application file for complete search history.

(56) References Cited

U.S. PATENT DOCUMENTS

| | | | |
|---|---|---|---|
| 5,563,922 A | 10/1996 | Beltz | |
| 6,166,535 A | 12/2000 | Irle | |
| 6,236,199 B1 | 5/2001 | Irle | |
| 6,255,810 B1 | 7/2001 | Irle | |
| 6,304,076 B1 | 10/2001 | Madni | |
| 6,366,078 B1 | 4/2002 | Irle | |
| 6,412,364 B1 | 7/2002 | Berglar | |
| 6,443,020 B1 | 9/2002 | Lin | |
| 6,483,295 B2 | 11/2002 | Irle | |
| 6,520,031 B2 | 2/2003 | Mandni | |
| 6,593,734 B1 | 7/2003 | Gandel | |
| 6,611,790 B1 | 8/2003 | Reichl | |

FOREIGN PATENT DOCUMENTS

GB    2352522    1/2001

OTHER PUBLICATIONS

PCT Search Report, PCT/IB2006/000811, mailed Sep. 13, 2006

Primary Examiner—Bot LeDynh
(74) Attorney, Agent, or Firm—Gifford, Krass, Sprinkle, Anderson & Citkowski, P.C.

(57) ABSTRACT

An inductive position sensor for rotary motion includes a transmitter coil and a receiver coil, the receiver coil generating a receiver signal when the transmitter coil is excited by an alternating current source. A moveable coupler element modifies the inductive coupling between the transmitter coil and the receiver coil so that the receiver signal is sensitive to the coupler element position. The ratio between the receiver signal and the reference signal is sensitive to the coupler element position, but substantially insensitive to common mode factors. The angular or positional range of the position sensor can be increased using a plurality of receiver coils.

26 Claims, 5 Drawing Sheets

INDUCTIVE POSITION SENSOR WITH COMMON MODE CORRECTIVE WINDING AND SIMPLIFIED SIGNAL CONDITIONING

REFERENCE TO RELATED APPLICATIONS

This application claims priority from U.S. Provisional Patent Application 60/669,145, filed 7 Apr. 2005, the contents of which are incorporated herein by reference.

FIELD OF THE INVENTION

This invention relates to a non-contacting inductive sensor for measuring the position of a moveable part, such as a pivoting throttle pedal.

BACKGROUND OF THE INVENTION

Motorized vehicles, such as automobiles, are provided with a user-operated control that controls engine speed. Typically, the user-operated control comprises a pedal arm having a foot pedal at a lower end of the pedal arm, typically referred to as an accelerator pedal. An accelerator pedal provides a throttle control signal that is transmitted from the accelerator pedal to an engine throttle control associated with the engine. Conventionally, there is a mechanical connection between accelerator pedal and the engine throttle control, and the throttle control signal is a mechanical signal. However, there has been a recent trend towards electronically controlled throttle control systems, sometimes termed fly-by-wire systems, in which the accelerator pedal or other user operated control is in electrical communication with the engine throttle control, the throttle control signal being an electronic signal. For commercial acceptability, such electronic throttle control systems should be reliable and not excessively expensive to manufacture.

SUMMARY OF THE INVENTION

An apparatus for determining a part position of a moveable part comprises a transmitter coil, the transmitter coil generating electromagnetic radiation when the transmitter coil is excited by a source of electrical energy, one or more receiver coils disposed proximate to the transmitter coil, the receiver coil generating a receiver signal when the transmitter coil is excited due to an inductive coupling between the receiver coil and the transmitter coil, and a coupler element. The coupler element is moveable and has a coupler element position correlated with the part position, for example by mechanical attachment or other mechanical coupling. The coupler element modifies the inductive coupling between the transmitter coil and the receiver coil so that the receiver signal is correlated with the part position, and may be a metal plate, conducting loop, or comprise a plurality of conducting loops.

Rotation or linear motion of the coupler element can be used to modify the inductive coupling between the transmitter coil and the receiver coil, for example by modifying the reference signal obtained from receiver coil by modifying of the flux coupling between transmitter and receiver coils as a function of the angular position of the coupler element. The coupler element position may be correlated with a pedal position, for example pedal movement being mechanically coupled to the angular position of the coupler element. There may be two or more receiver coils, and there outputs combined to extend the angular or positional range of the sensor. An angular range or other positional range may be divided into segments, with the receiver signal for each segment being chosen depending on the angular range of the segment. By keeping track of segment history, extended angular range and multi-turn sensors were developed.

A reference coil generates a reference signal when the transmitter coil is excited due to an inductive coupling between the transmitter coil and the reference coil that is substantially independent of the coupler element position. The reference signal can be used to compensate any variations in receiver signals that are not related to coupler element position changes, for example due to common mode factors such as temperature, excitation voltage of the transmitter, and changes in relative coil and coupler separations. Electronic circuitry can be provided to form a ratiometric signal, the ratiometric signal being a ratio of the receiver signal and the reference signal. The ratiometric signal is sensitive to the angular position of a rotating coupler element, but not to common mode factors. The gap distance between a rotating coupler element and a coil assembly can also be compensated for using the reference coil.

In an example apparatus, the output signal is derived from a first receiver signal over a first segment of the positional range, and from a second receiver signal over a second segment of the positional range. Further receiver signals (from other receiver coils, or inverted versions of the first and second receiver signals) can be used for other segments. For each segment, there is preferably at least one receiver signal that allows good linearity of output signal versus position to be obtained. The segment history can be tracked and stored, and stored segment information used to select the best receiver signal to use. The selected receiver signal may be selected from a set of non-inverted and inverted receiver signals. The output signal may have a substantially linear dependence on part position over the positional range (for example, a positional angle range of theta degrees), the output voltage being adjusted by an adjustment value according to the segment of the positional range so that the output voltage over one segment smoothly transitions to the output voltage over an adjacent segment. For a rotational sensor, the output may be a sawtooth form as the positional angle range repeats due to multiple turns of a rotating part.

DETAILED DESCRIPTION OF THE INVENTION

Figure 1A:
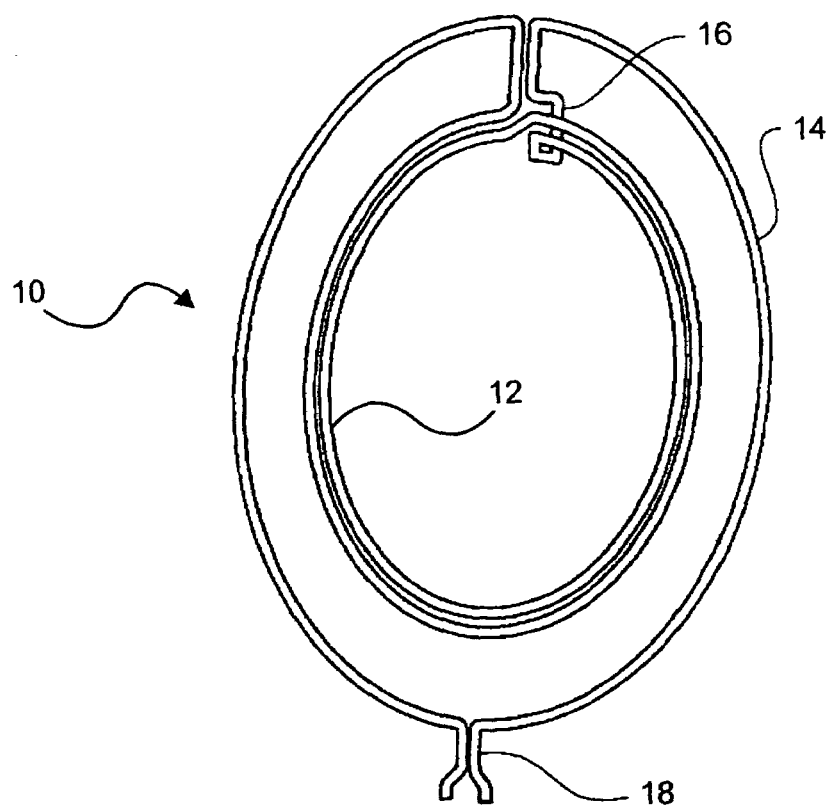
FIG. 1A illustrates a reference coil.

Examples of the present invention include an inductive position sensor which can be adapted for use in a throttle pedal position detector in an automotive vehicle, or position of other moveable objects. In representative examples, the sensor includes a transmitter coil and a receiver coil, both formed by printed circuit techniques on printed circuit board. Inductive coupling between the transmitter coil and receiver coil induces a receiver signal in the receiver coil when the transmitter coil is energized, for example by an alternating current source. A coupler element, attached to the moveable object, spatially modifies the inductive coupling between the transmitter coil and the receiver coil, allowing the receiver signal to be used to find the position of the moveable object.

Inductive position sensors can include a transmitter or exciter coil powered by an AC source, a receiver or pickup coil for generating an induced signal in response to the time varying magnetic field generated by the transmitter coil, and an electrically conductive element positioned adjacent to the coils such that the time varying magnetic field generates eddy currents in the coupler element which modify the currents induced in the receiver as a function of the position of the coupler element.

The coupler element can be connected to a moveable part whose position is to be measured, such as the throttle pedal of an automotive vehicle, such that the angular (or rotational) position of the coupler is a function of the position of the throttle element. Thus, the voltage induced in the receiver or pickup coil is varied; by detecting the received voltage, the position of the coupler element, and thus the throttle plate may be determined. This signal may be used to control the speed of the vehicle engine.

General Description

An example inductive position sensor comprises a transmitter coil connected to an exciting alternating current source, and a receiver coil. The transmitter coil and receiver coil are supported on the same printed circuit board as a coil assembly, either essentially co-planar, or on different sides or layers of the same board. A moveable coupler element is supported proximate to the board, and modifies the inductive coupling between the transmitter coil and the receiver coil. In one example, the coupler element rotates about a rotation axis, which may be a central axis of one or both of the transmitter coil and receiving coil. The coupler element position modifies the amplitude of the receiver signal induced by the transmitter coil by modifying the inductive coupling between the transmitter coil and the receiver coil. Further examples are described in our co-pending U.S. Patent Application, KSR-12902.

The amplitude of the receiver signal is a function of the gap between the coupler element and the printed circuit board, which inherently varies to a certain degree in a production situation. To correct the receiver signal for the variations resulting from the gap as well as other common mode signals such as variation of exciter or supply voltage, EMC, and temperature variation, a reference coil can also be used, for example formed on the same printed circuit board as the transmitter coil and the receiver coil. The reference coil receives the same signals as the receiver coil, but is configured in such a way that the reference signal is insensitive to variations in the rotary position of the coupler element. A signal conditioning circuit (or signal conditioner) receives the receiver signal and the reference signal and forms a ratio signal, representative of the ratio of the receiver signal and the reference signal. The ratio signal is correlated with coupler element position, but can be substantially independent of gap variation and the other common mode factors, within reasonable variations, as discussed further below.

A printed circuit board can be configured having an input for electrical energy, and outputs providing the receiver signal and the reference signal. Alternatively, electrical circuitry on the board may be used to generate a ratio signal, as the ratio of the receiver signal and the reference signal. Signal processing circuitry can be used to divide the receiver signal by the reference signal to substantially eliminate signal variations which are not a function of the coupler position.

An inductive sensor according to an example of the present invention comprises a transmitter coil (which may also be referred to as an exciter coil) connected to an alternating current source such as a Colpitts oscillator, a receiver coil, and a coupler element supported in physical relationship to the transmitter coil and the receiver coil so that the position of the coupler element affects the strength of the inductive coupling between the transmitter coil and the receiving coil. A receiver signal provided by the receiver coil can be correlated with the position of the coupler element.

Transmitter Coil

The transmitter coil can be one or more loops in a conventional circular coil design, or other configurations can be used. The transmitter coil, which may also be referred to as an exciter coil, is excited by a source of alternating current. The exciting source or alternating current may be an electronic oscillator, such as a Colpitts oscillator, or other electronic oscillator.

When excited by electrical energy, the transmitter coil produces an electromagnetic field. There is inductive coupling between the transmitter coil and any other proximate coils, which induces a signal in that coil. The transmitter coil may be a circular coil having one or more turns. An excitation signal is provided to the transmitter coil by an alternating current source. Inductive coupling between the transmitter coil and the receiver coil generates a receiver signal in the receiver coil.

Coupler Element

A coupler element modifies the inductive coupling between the transmitter coil and the receiver coil. The coupler element need not be located between the transmitter coil and receiver coil, though it could be if that was a convenient configuration. Further, the coupler element need not modify the total flux coupling between the transmitter coil and the receiver coil, but may only modify the spatial distribution of the flux coupling. A coupler element, if a conducting plate, may also be referred to as an eddy plate.

A coupler element can be an electrically conducting element which is generally planar in shape and which may comprise one or more radially extending lobes, and can be supported for rotation about the center line of the transmitting and receiving coils with its lobe or lobes parallel to and closely spaced from the printed circuit board. The configuration of lobes may depend largely on the configuration of the receiver coil. The coupler element is attached to, or otherwise mechanically coupled to a moveable object, so that its rotational position is a function of the position of the moveable object. The configuration of the receiver coil, discussed further below, may be such that a voltage is developed at the output of the receiver coil which is a function of the position of the coupler element. In an example vehicular application, the coupler element is attached to, or otherwise mechanically coupled to a moveable pedal arm or other vehicular control arm, so that its rotational position is a function of the position of the moveable arm.

The coupler element may have an initial position, relative to the receiver coil, at which the receiver signal is a minimum. As the coupler element moves from the initial position, it modifies the inductive coupling between the transmitter coil and the receiver coil. In examples of the present invention, in the initial configuration of the coupler element, induced potentials within the receiver coil are of similar magnitude and of opposite phase, so they tend to cancel out. As the coupler element rotates, the inductive coupling between the transmitter coil and the first loop configuration is modified, and induced potentials within the receiver coil no longer cancel out so that the receiver signal increases.

Receiver Coil

One or more receiver signals are provided by receiver coil(s) having a differential structure. A receiver signal may contain contributions from various electrical potentials induced in loop configurations by flux coupling to the transmitter coil. A receiver coil may include a first loop configuration and a second loop configuration that provide first and second potentials, respectively, and the coil configuration such that these potentials cancel out in the absence of the coupler element. With the coupler element present, the first and second potentials are modified differently, depending on the angular position of the coupler element.

For example, the first and second loop configurations may be configured to generate signal that are of opposite phase, the receiver signal being the combination of the first and second signals, and hence the receiver signal has a minimum value when the first and second signals have similar magnitudes. The receiver signal may also be termed a difference signal, as the magnitude of the receiver signal is a difference between a first signal amplitude induced in the first loop configuration, and a second signal amplitude induced in a second loop configuration, and such a configuration called a differential structure. In other examples of the present invention, the receiver coil may provide separate first and second signals from separate loop structures to an electronic circuit for processing.

The first and second loop configurations of a single receiver coil can be configured to provide first and second voltages of opposite polarity for a given magnetic flux change through the receiver coil. The receiver coil can be configured so that the first and second signals tend to cancel each other in the absence of the coupler element. The coupler element also may have a zero position in which it blocks flux transmission to the first loop configuration and second loop configuration equally, so that the first signal and second signal effectively cancel each other out. As the coupler element moves in a first direction relative to the initial position, it blocks more magnetic flux inducing the second signal, while at the same time blocking less magnetic flux that induces the first signal. Hence, the magnitude of the first signal increases, the magnitude of the second signal decreases, and the receiver signal increases in magnitude. The coupler element may also be moveable in a second direction, in which the magnitude of the second signal increases, and that of the first signal decreases.

Extended Angular Range and Multi-Turn Coils

Examples of the present invention also include extended angular range sensors such as multi-turn sensors. A multi-turn sensor may comprise a plurality of receiver coils, for example using two or more multi-pole coils having an angular offset to each other. Sensors may include an electronic module having an ASIC module for signal conditioning. The electronic module may comprise a printed circuit board supporting coils such as a reference coil, one or plural receiver coils, and transmitter coil which generates an electromagnetic field on excitation by an alternating current source. For multi-turn sensing, the virtual ground can be adjusted with the number of turns (or multiples of some rotation angle), while the rotation history of the sensor is managed by a logic stack. The decision of which receiver signal to use is decided by a logic circuit. One of a plurality of receiver coils is selected using a multiplexer when the predetermined signal voltage is reached.

For example, using a 3 pole coupler element, the angular range of a single receiver coil may be approximately 30 degrees. The virtual ground level can be set according to the number of multiples of this angular range. The angular range of the sensor system may be 120 degrees with using three receiver coils and segment management. The rotation history can be stored in memory, for example using stack operation with a linked list data structure. A virtual ground adjuster may used that is similar to that used for adjustment of the plateau voltage.

The output voltage may not be entirely linearly dependent on position. A useable range of linearity may be defined, extrapolating to a virtual ground, which may be a negative voltage relative to the true ground. The ratio signal may be formed as the ratio of (receiver signal+A)/(reference signal+B), where the reference signal and receiver signal refer to DC voltages obtained by, e.g. demodulating and low-pass filtering of the receiver and reference signals, respectively. A and B refer to virtual ground corrections, due to assumed linearity over a slightly non-linear response. The width of the useable linear range may be determined by accuracy specifications. The correction terms A and B are likely to be very similar, and the same value can be used for both A and B.

The output voltage ranges can be clamped to upper and lower plateau. Trim is used to adjust the gain slope to a desired value, using trim resistors. Laser trimming of resistors can be used, for example by burning off carbon strips, or traditional rotating wiper variable resistors may also be used in some applications. In an automotive electronic throttle control application, this trim step can be carried out once, during factory adjustments. This can be very effective where ratiometric sensing is used.

FIG. 1A illustrates a reference coil 10 having a differential structure. For magnetic flux variations through the plane of the coil, the electric potentials of opposed handedness are induced in the inner turns 12 and outer turn (14) of the coil. Little potential is generated in radial structures such as 16. As the inner turns have a smaller diameter than the outer loops, more inner turns are required to cancel the potential induced in the outer turn(s). If the reference coil has an outer diameter $D_o$ and an inner diameter $D_i$. T, the configuration of the reference coil allows the reference output to be zero when the coupler element is removed. The reference signal at the output (18) arises from the potential generated in the inner turn(s) and the opposed potential generated in the outer turn(s). The coupler element, when located proximate to the reference coil, blocks part of the inductive coupling to the outer turns leading to a resultant reference signal. The reference signal is substantially independent of the rotational position of the coupler element, but is sensitive to the gap between the coupler element and the reference coil, being greater for small gaps. The reference coil can be designed so that induced signals in the radial parts of the coil configuration cancel.

An approximate formula, which assumes uniform flux is $n_i D_i^2 = n_o D_o^2$, where $n_i$ is the number of inner turns, and $n_o$ is the number of outer turns. In this example, the reference coil has one outer turn and two inner turns. In constructed devices, it was found that the flux intensity was stronger towards the outer perimeter. Example coils had two inner turns having a diameter of 17.7 mm (or 3 inner turns having a diameter of 14.4 mm) and an outer turn having a diameter of 25 mm. The reference coil can be adjusted experimentally so that there is zero reference signal when the coupler element is detached, and a maximum signal when the coupler is close to the reference coil. In certain cases, it is not necessarily zero when the coupler is removed in order to match the same characteristic curve for the effective gap, which might be useful in some applications.

In preferred examples of the present invention, a reference coil, preferably having a differential configuration, is provided which provides a reference signal that is substantially independent of the position of the coupler element. However, the reference signal is susceptible to the same factors, which may be referred to generally as common mode factors, that influence the strength of the receiver signals. The common mode factors may include one or more of the following: coupler gap between the coupler element and the transmitter (or receiver) coil, variations in the excitation voltage applied to the transmitter coil, environmental electromagnetic fields inducing receiver noise, temperature variations, and the like.

An inductive sensor may be calibrated so that the sensor output takes a standard form independent of production variations in the form of the sensor. In an automotive system, the coupler gap between the coils (which may be supported on a printed circuit board) and the coupler element (which is linked to the accelerator pedal) strongly influences the induced signals in the receiver coil, and this coupler gap is difficult to precisely control in a mass production process. However, calibration processes can be a source of error and expense.

Conventional inductive sensors require extensive calibration curves for common mode factors such as temperature. For example, a conventional inductive sensor may include a temperature sensor, a look-up table of temperature correction factors, and circuitry to implement temperature correction. Using a ratiometric signal according to an example of the present invention, much of this additional complexity and associated unreliability can be avoided.

By determining a ratio signal as a ratio of the receiver signal and the reference signal, the effects of the common mode factors can be greatly suppressed, so that the ratio signal is substantially independent of the common mode factors, but correlated with the coupler position. The ratio signal can be determined entirely using analog circuitry, avoiding the complexity and processing delays of digital logic, and also avoiding the need for a high-resolution analog-to-digital converter.

The reference coil may be similar in extent to the receiver coil, but can be configured in such a way that the reference voltage induced in the reference coil by the transmitter coil is substantially independent of the position of the coupler element. The inductive coupling between the transmitter coil and the reference coil is affected by similar common mode factors as affect the inductive coupling between the transmitter coil and the receiver coil. These factors include a gap between the coupler element and a printed circuit board supporting the transmitter coil and the receiver coil, or the gap between the coupler element and the transmitter coil, or other structure supporting the transmitter coil. Other common mode factors which may be compensated for using the reference coil include receiver signal variations resulting from variations in the alternating current power supply to the transmitter coil; variations resulting from induced voltages from stray electromagnetic signals unrelated to the sensor operation, temperature variations and the like.

Figure 1B:
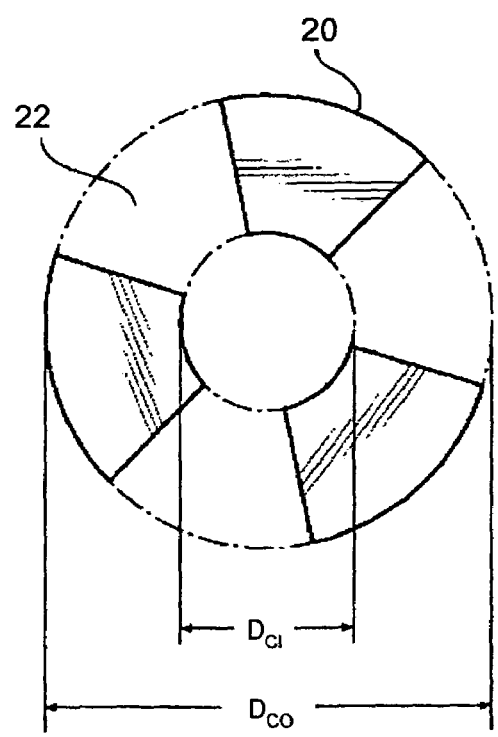
FIG. 1B illustrates a coupler element comprising segmented electronic conductors.

FIG. 1B shows a coupler element for a rotation sensor which comprises segmented electrical conducting regions 20 on a non-conducting substrate 22. In the absence of the coupler element, there is no signal from the reference coil. In certain cases, it is not necessarily zero when coupler is removed in order to match the same characteristic curve for the effective gap, which might be useful for some applications. However, the reference coil produces a reference signal when located parallel and close to the coupler element, the reference signal being correlated with the gap between the coupler element and the reference signal.

Preferably, the inside diameter of the coupler element segments is approximately equal to the inner diameter of the receiver coils. The outer diameter is preferably approximately equal to or less than the diameter of the transmitter coil.

The coupler element may be supported on a rotating disk. In electronic throttle applications, the pedal depression causes a rotation of the coupler element, which is detected by inductive sensors according to the present invention.

Figure 2:
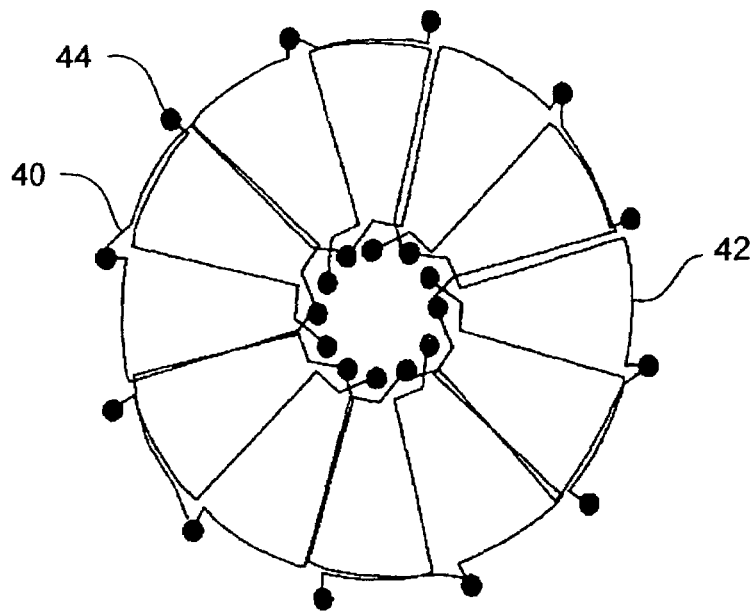
FIG. 2 shows a pair of receiver coils.

FIG. 2 shows a double receiver coil structure. The double receiver coil comprises two receiver coils (40 and 42) arranged so that the two receiver coils are displaced 90 degrees in electrical phase from one another, while each of receiver coil has its own forward and backward coil pair to produce differential signal (the two receiver signals are obtained out of phase). The use of two or more receiver coils allows angular position to be measured beyond the linear region of the first coil. The dark circles (44) represent posts through a circuit board with some connections hidden. The figure shows two sets of somewhat L-shaped conductors arranged in opposed directions.

Figure 3:
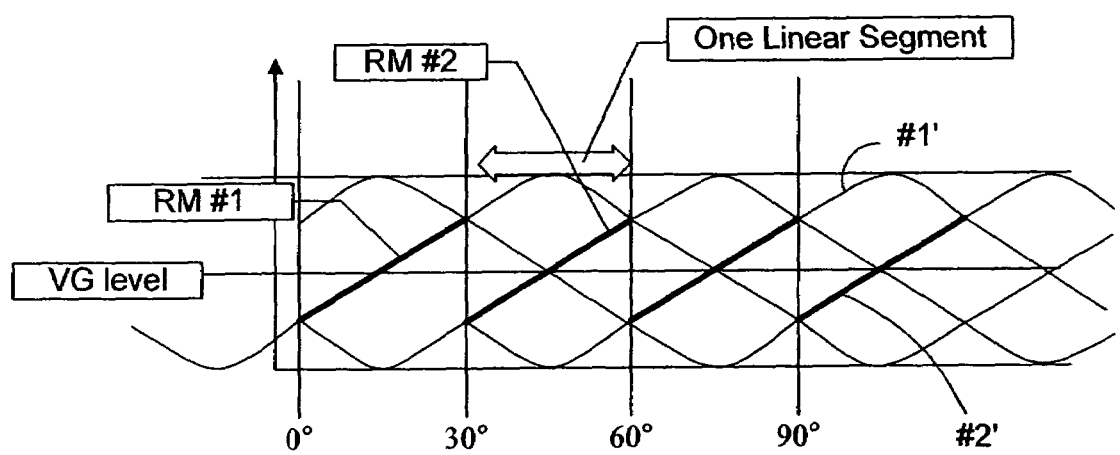
FIG. 3 shows sensor output signals from which linear segments can be selected.

FIG. 3 illustrates the signals obtained from the first and second receiver coils (denoted #1 and #2 respectively). These two signals show linear regions highlighted as bold lines. Further, these two signals can be inverted to provide third and fourth signals from the two receiver coils (denoted #1' and #2' respectively). In this example, the first receiver coil allows linear position measurements over the range of 0–30 degrees. At a measured angle of 30 degrees, information from the second receiver coil allows extending the angular range to 60 degrees, and using the inverted signals further extends the angular measurement region up to 120 degrees. Hence, sensor electronics may be used to select one of the linear segments, according to the angular range. The virtual ground (VG) level is also shown.

Figure 4:
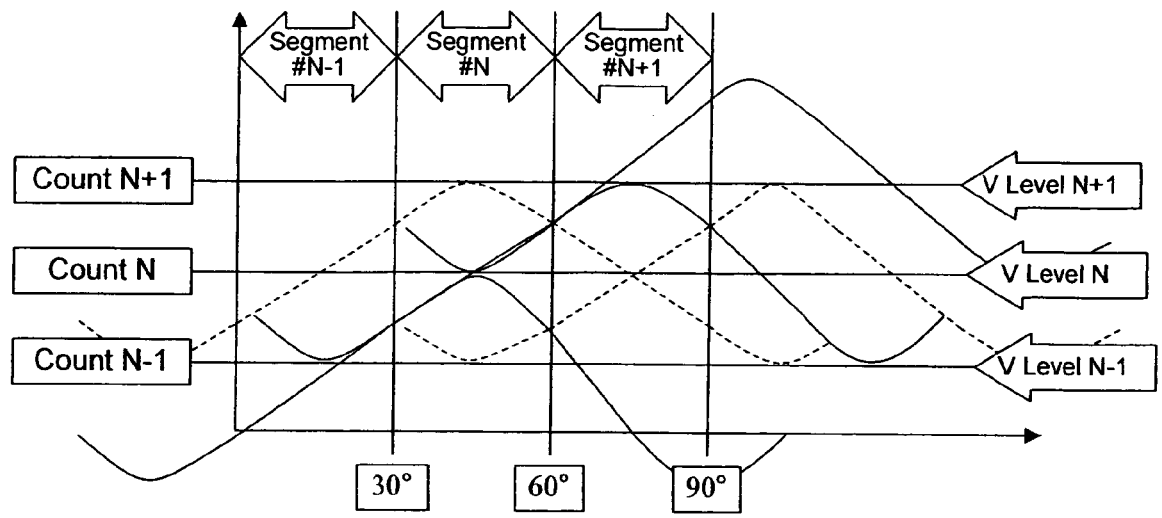
FIG. 4 shows a linear output signal composed of a number of linear segments.

FIG. 4 shows how a linear sensor output can be obtained from the sensor system over an extended angular range. A stack counter is used to keep track of the segment number, and a voltage offset is added to the output voltage to obtain an extended linear output from the linear portions of the various signals.

A logic circuit (the stack) pushes in or pops out one unit, and correspondingly the voltage converter increases or decreases the unit voltage level shown. The count shown along the ordinate corresponds to the value in the stack. The logic unit maintains the switch status of the digital-to-analog (DS) converter corresponding to the depth of the stack. Using a 3 pole coupler element, a maximum reasonable range of linearity is 30 degrees. The voltage level can be set according to the number of crossing points detected, as described below in relation to FIG. 5, or segments moved through. Hence, the angular range of linear signal can be at least 120 degrees with 3 segment management. Record keeping can be done with stack operation of a linked list of data structure.

Figure 5:
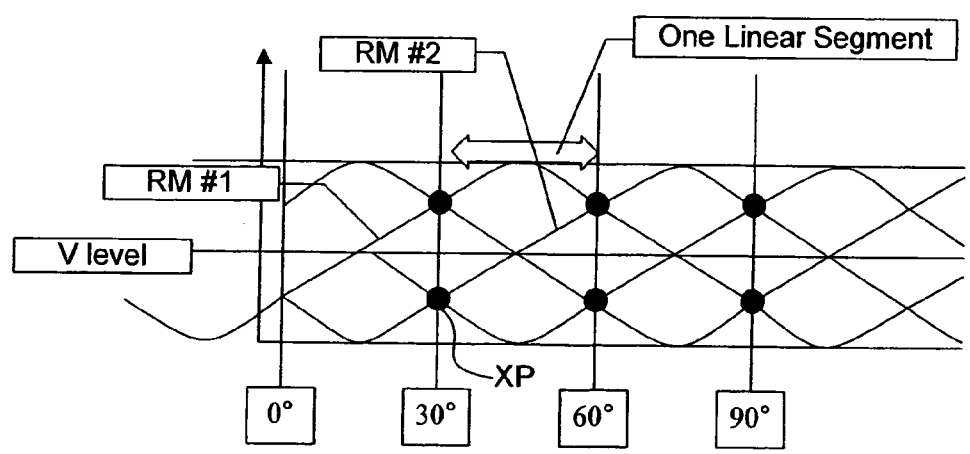
FIG. 5 shows crossing points which may be used to limit the linear segments.

FIG. 5 illustrates selection of crossing points between the various signals as the points to shift from one signal to another. At the crossing points (denoted XP), the offset voltage is adjusted to obtain a linear output. The offset voltage can be achieved using an adjustable virtual ground circuit, for example using an operational amplifier having switchable potential divider to one input. As in FIG. 3, the graph shows the first and second receiver signals (#1 and #2), along with the inverted signals.

A comparator/selector circuit can be used to select the desired signal. In this example, the first decision point is at 30°. The comparator compares the first and second receiver signals, and they are identical within a certain tolerance. The signal selector then selects the inverted form of the second receiver signal, so that the signal increases linearly in the same direction as before.

For multi-turn operation, the virtual ground is adjusted according to the number of segments (or turns), while the segment history (and hence turn history) is managed by a stack. A logic unit can be used to select a given ratiometric signal. One of multiple signals can be selected using a multiplexer when a predetermined signal value is reached.

Figure 6:
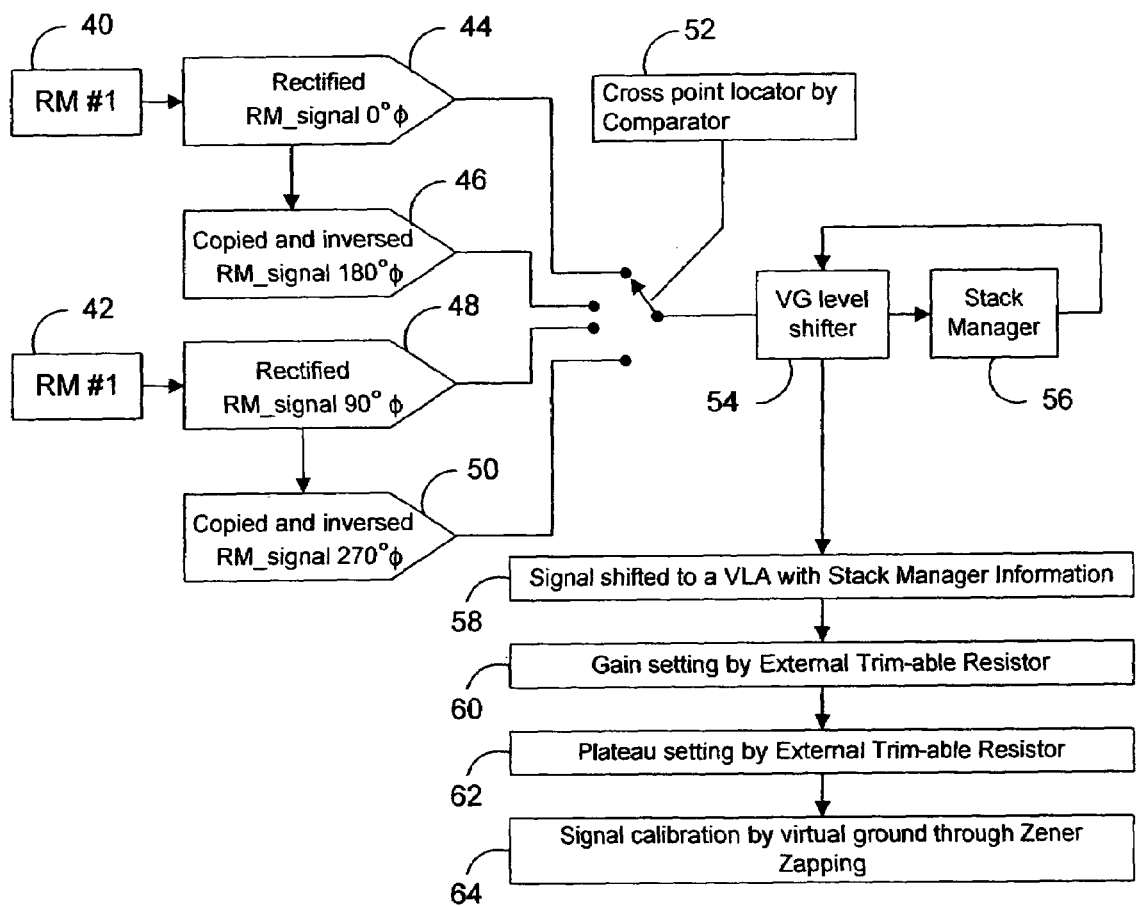
FIG. 6 shows a block diagram of the system, and the signal flow.

FIG. 6 shows a simplified schematic of a multi-turn sensor according to the present invention. The schematic shows first and second receiver coils 40 and 42. Each receiver signal is rectified (by rectifiers 44 and 48), and inverted (by inverters 46 and 52). A comparator 52 selects the crossing points, as shown in FIG. 5, to select the signal used. A stack manager is used to keep track of which segment is being used, and the voltage level shifter 54 adds an offset voltage to the signal to obtain a linear output.

The boxes at the lower right summarize signal flow. Box 58 corresponds to shifting the signal with a VLA using data from the stack manager. Box 60 corresponds to gain setting using an external trimmable resistor. Box 62 corresponds to plateau setting using an external trimmable resistor. The plateau values are the upper and lower signal values obtained within any one segment. Box 64 corresponds to signal calibration by adjusting a virtual ground using Zener zapping. Calibration data may be stored in digital form; and a digital to analog converter used to adjust the output voltage to a desired range.

Figure 7:
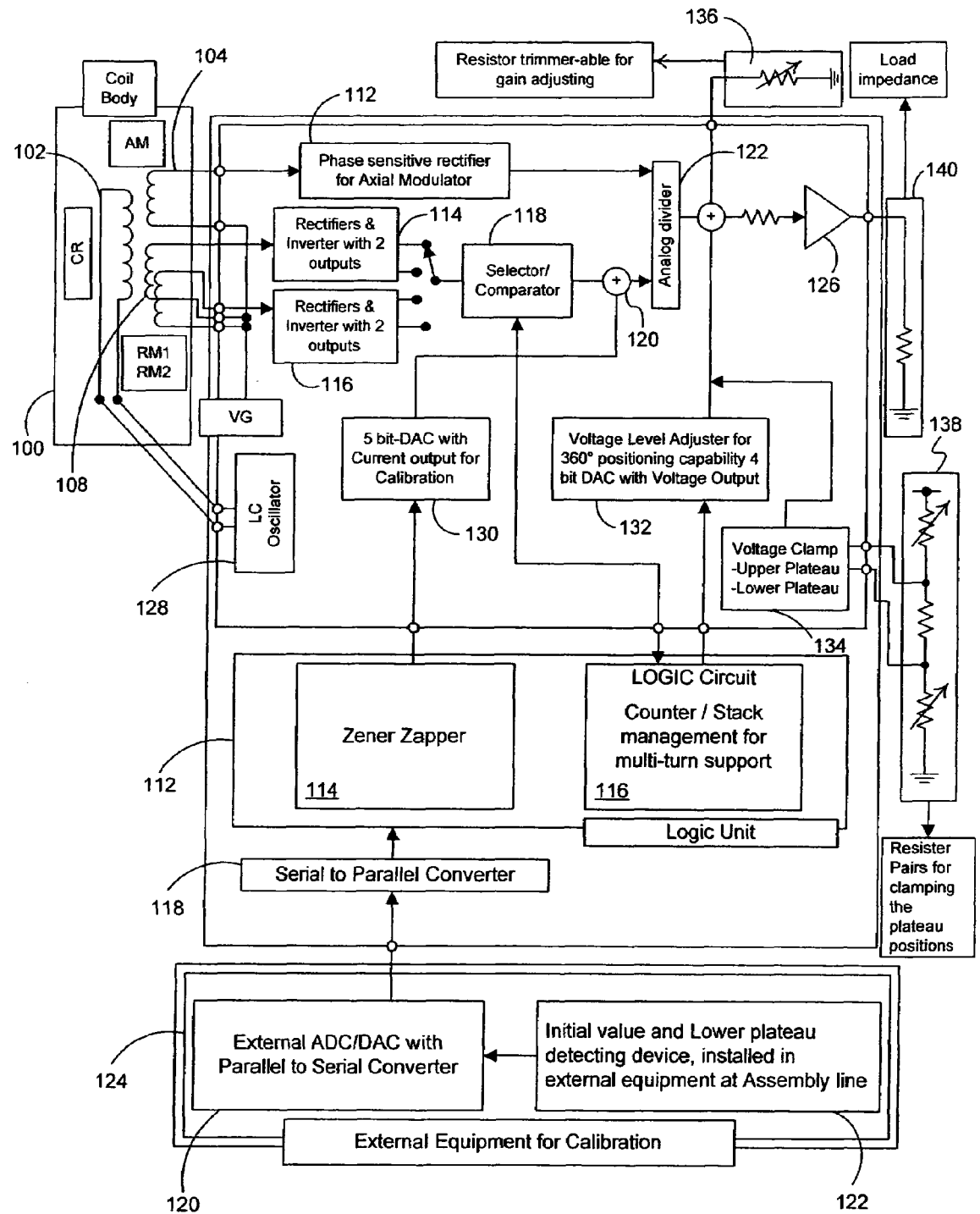
FIG. 7 shows a block diagram of a multi-turn sensor system.

FIG. 7 shows a block diagram for a multi-turn sensor system. The system comprises a coil body 100, which includes a transmitter coil 102, reference coil 104, and two receiver coils (106 and 108). The electronics module 110 comprises a phase sensitive rectifier for the reference signal (112), rectifier/inverters for the first and second receiver signals (114 and 116), comparator 118, adder 120, analog divider 122, output amplifier 126, oscillator 128 to drive the transmitter coil, a 5-bit DAC (130) with current output for calibration, a voltage level adjuster (132) for 36o degree positioning capability and including a 4 bit digital to analog converter (DAC), and a voltage clamp 134. Trimmable resistors 136 and 138 allow adjustment of gain and clamp voltages, respectively. The clamp voltages define limits outside of which the output voltage through the load resistance (140) cannot go. The logic unit 112 comprises a Zener zapper 114 and counter/stack 116. External calibration equipment 124 includes an external analog-to-digital converter with parallel to serial converter (118), communicating with the logic unit using a series to parallel converter 118, and voltage measurement device 122 which measures output voltages for calibration.

The transmitter coil 102 is energized by an alternating current source 128 connected to ends of the transmitter coil. The energized transmitter coil generates an electromagnetic field, which induces signals in the reference coil 104 and the two receiver coils 106 and 108 by inductive coupling. The inductive couplings between the transmitter coil and the reference coil and the two receiver coils are modified (reduced) by a coupler elements, such as a rotating disk having conducting regions thereon. However, the inductive coupling between the transmitter coil and the reference coil is not sensitive to the angular position of the rotating coupler element. In contrast, the receiver signal is sensitive to the angular position of the rotating coupler element, so that the ratio of the selected receiver signal and the reference signal formed by analog divider 122 is correlated with the angular position of the rotating coupler element while being corrected for common mode factors such as the gap between the transmitter coil and the rotating coupler element. Rotation of the rotating coupler element modifies the inductive coupling between the transmitter coil and the two receiver coils, but does not influence significantly the inductive coupling between the transmitter coil and the reference coil.

Different output formats may be chosen for a multi-turn sensor. One output format may be a 360 degree sawtooth, another example is a 180 degree sawtooth, and another may be a 90 degree sawtooth signal. For automotive applications, the output voltage may range from 0.25 V to 4.75 V. A single linear sawtooth signal is composed of 12 segments of 30° linear sensor signal contributions in the example of a 3-pole receiver coil. If a 6 pole receiver coil is used, a single sawtooth signal will have 24 segments of 22.5°. Hence, the voltage level adjuster and logic/stack should have 5 bit capability.

In an alternative approach, a selector (such as a multiplexer) is used to select a receiver signal from a plurality of receiver signals, according to the segment of the positional range. The latter information can be derived from a logic unit including counter/stack arrangement. The selected receiver signal then passes through a phase sensitive rectifier to an analog divider. The second input to the analog divider is the reference signal from the reference coil, passed through a phase sensitive rectifier to the analog divider. The logic unit can also control a virtual ground level adjuster, to adjust the output voltage appropriately for each segment of the positional range to obtain a linear output. For example, the virtual ground level adjuster may include a 4 bit DAC, where a 4 resistor array is used to control an analog virtual ground output. Calibration may be achieved using a second virtual ground level adjuster, using for example a 6-bit DAC. Initial values, lower and upper plateau voltages may be detected in an initial calibration step, and the logic unit programmed to determine the appropriate combination of resistors to give the required plateau values. This calibration needs only to be done once, during manufacture, a great advantage over many conventional devices.

Applications

Applications of examples of the present invention include apparatus where the coupler element is attached to a moveable part, the position of which is desired to be monitored, and the transmitter coil, receiver coil, and supporting circuitry are disposed on a substrate, such as a printed circuit board. The substrate is receivable by or otherwise secured proximate to a housing or other structure in which the moveable part moves. For example, the moveable part may be a pedal, and the pedal housing may be configured to receive a printed circuit board on which the coils are printed. Production assembly variations may lead to variations in the gap between the coupler element and the printed circuit board, and the use of the reference coil allows compensation for such manufacturing variations without need for extensive calibration processes. In vehicular application, the coupler element is mechanically connected to a throttle pedal so that its rotational position is a function of the throttle pedal position.

The coil arrangements may take a wide number of forms. For example, the coils may be wound with different numbers of poles, which affects the position resolution of the sensor. The receiver coil is configured so that the position of the coupler element modulates the amplitude of the receiver signal. A reference coil, if used, can be configured such that the reference signal is substantially independent of the position of the coupler element, so that a ratio signal derived using the reference signal and the receiver signal is also correlated with the position of the coupler element, but substantially independent of factors such as temperature.

In one example, the transmitter coil, receiver coil, and the reference coil are formed on a printed circuit board, which may be a multi-layer printed circuit board located proximate to the coupler element. In other examples, the coils can be formed on separate structures. The coupler element can be an intrinsic part of a moveable part whose position is to be measured, or can be attached to the moveable part, or otherwise mechanically coupled so that the coupler element position is correlated with the moveable part position. Embodiments of the present invention include angle sensors, rotation speed sensors, and distance sensors where distance is determined from the total angular rotation of a moveable part.

Inductive sensors according to the present invention include non-contacting inductive sensors used in automotive applications, including sensors employing a transmitter winding excited with an alternating current, a receiver winding, a rotatable coupler element connected to the throttle pedal and positioned in relation to the windings for varying the amplitude of the transmitter signal induced in the receiving coil, and a third coil which receives a signal similar to the receiver signal, the signal being substantially independent of the coupler rotation position, for use in compensating the received signal for variations in the gap between the coupler and the coils as well as other common mode signals.

In vehicular applications, the coupler element can be mechanically connected to a throttle pedal so that its rotational position is a function of the throttle pedal position. Applications of examples of the present invention include configurations where the coupler element is attached to a moveable part, the position of which is desired to be monitored, and the transmitter coil, receiver coil, and supporting circuitry are disposed on a substrate, such as a printed circuit board. The substrate is receivable by or otherwise secured proximate to a housing or other structure in which the moveable part moves. For example, the moveable part may be a pedal, and the pedal housing may be configured to receive a printed circuit board on which the coils are printed. Production assembly variations may lead to variations in the gap between the coupler element and the printed circuit board, and the use of the reference coil allows compensation for such manufacturing variations without need for extensive calibration processes. Other applications of position sensors include an electronic throttle control, suction pipe valve, braking control, steering, fuel tank level reading, and gear selector shafts.

Embodiments of the present invention include a signal conditioning system for use with a non-contacting inductive sensor for measuring the position of a moveable part such as a pivoting throttle pedal in an automotive application, and for generating an electrical signal which is directly proportional to the position of the part for controlling the vehicle, and more particularly to such a signal conditioning system which operates with an inductive sensor. The inductive sensor preferably has at least three windings, comprising an transmitter coil for generating a carrier signal, a receiver coil for detecting the carrier signal as modulated by a coupler element coupled to the part whose position is to be measured, and a reference coil which receives the carrier signal but is wound in such a way as to be unaffected by the position of the rotor so as to generate a signal which may be used to correct the rotational modulator signal for variations in the gap between the rotor and the three windings as well as other common mode signals such as power supply fluctuation. Examples of the present invention do not need to store temperature calibration data, as this common mode factor is compensated for using the reference signal.

Multi-turn sensors according to the present invention can be used as speed and/or distance sensors. Information such as wheel diameter may be used to obtain such motion factors.

Other Configurations

The coil arrangements may take a wide number of forms. For example, the coils may be wound with different numbers of poles, which affects the position resolution of the sensor. The receiver coil is configured so that the position of the coupler element modulates the amplitude of the receiver signal. A reference coil, if used, can be configured such that the reference signal is substantially independent of the position of the coupler element, so that a ratio signal derived using the reference signal and the receiver signal is also correlated with the position of the coupler element, but substantially independent of factors such as temperature.

In one example, the transmitter coil, receiver coil, and the reference coil are printed on a printed circuit board, which may be a multi-layer printed circuit board. In other examples, the coils can be formed on separate structures.

In other examples, the transmitter coil may be a loop having one or more turns. In other examples may includes a first loop configuration and a second loop configuration, the first loop configuration and second loop configuration having opposite winding directions so that the transmitted electromagnetic flux has a spatial variation of magnetic field direction, including regions of opposed magnetic field direction. A coupler element can then be used to modify the ratio of opposed signals that would tend to be induced in a receiver coil.

In other applications of the invention, other mechanical elements could be used to drive the coupler. The coupler motion can be linear, rotational, or some combination of rotation and linear motion in one or more directions.

Hence, an example apparatus for providing an output signal correlated with a part position for a moveable part, the part position having a positional range comprises a transmitter coil generating electromagnetic radiation when excited by an exciter signal, a plurality of receiver coils located proximate to the transmitter coil, each receiver coil generating a receiver signal when the transmitter coil is excited, a coupler element having a position correlated with the part position and the receiver signals each being sensitive to the coupler element position, a reference coil providing a reference signal substantially independent of the part position that is being determined. The coils may be part of a coil assembly formed on a single circuit board. A signal conditioner, for example an electronic circuit on the same board, receives the various signals, selects a receiver signal according to the current segment of the positional range, and provides an output signal correlated with the position of the moveable part. The signal conditioner includes an analog divider, the selected receiver signal being divided by the reference signal in the analog divider so as to eliminate common mode noise effects from the output signal.

A signal conditioner may comprise an analog circuit, such as an ASIC, including the analog divider and voltage adjustments, and a logic unit comprising a digital electronic circuit. The logic unit can be used to store segment information and calibration data. Data stored in the logic unit can be conveyed to the analog circuit, and used to make appropriate adjustments to the output signal (including plateau values for a given segment), for example using one or more digital-to-analog converters. A selector used to select a chosen receiver signal may use segment information provided by the logic unit. Segment information is determined from a comparison of receiver signals, for example through detection of crossing points as discussed elsewhere.

A plurality of receiver coils may be substantially coplanar, for example formed along with the reference coil and transmitter coil as a coil assembly supported by a single circuit board. In some examples, all coils are substantially coplanar, and have the same central axis. In a rotation sensor, the coupler element may rotate about this central axis, and comprise metal plates that modify the flux coupling between transmitter and receiver coils. The coupler element may be attached or otherwise associated with the moveable part having a position to be measured.

A representative method of determining the position of a moveable part comprises exciting a transmitter coil, obtaining a plurality of receiver signals from a plurality of receiver coils, selecting a chosen receiver signal according to the approximate position of the moveable part (such as the segment), obtaining a reference signal substantially independent of the position of the moveable part, the reference signal and the chosen receiver signal being subject to common noise factors, dividing the selected receiver signal by the reference signal in an analog divider circuit to provide a ratiometric signal so as to eliminate the common noise factors; and determining the position of the moveable part using the ratiometric signal. The segment may be a predetermined portion of the positional range, such as a fixed fraction.

Patents, patent applications, or publications mentioned in this specification are incorporated herein by reference to the same extent as if each individual document was specifically and individually indicated to be incorporated by reference. In particular, U.S. Provisional Application Ser. No. 60/669, 145, filed Apr. 7, 2005, is incorporated herein in their entirety.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

I claim:

1. An apparatus for providing an output signal correlated with a part position for a moveable part, the part position having a positional range, the positional range being divisible into segments, the apparatus comprising:
    a transmitter coil, the transmitter coil generating electromagnetic radiation when excited by an exciter signal;
    a plurality of receiver coils located proximate to the transmitter coil, each receiver coil generating a receiver signal when the transmitter coil is excited due to inductive coupling between the transmitter coil and the receiver coils;
    a coupler element, having a coupler element position correlated with the part position, the inductive coupling between the transmitter coil and each receiver coil being sensitive to the coupler element position;
    a reference coil, providing a reference signal substantially independent of the part position;
    a signal conditioner receiving the receiver signals and the reference signal, and providing an output signal correlated with the position of the moveable part,
    the output signal being derived from a selected receiver signal, the selected receiver signal being selected according to the segment of the positional range,
    the signal conditioner including an analog divider, the selected receiver signal being divided by the reference signal in the analog divider so as to eliminate common mode noise effects from the output signal.

2. The apparatus of claim 1, wherein the output signal is derived from a first receiver signal over a first segment of the positional range, and from a second receiver signal over a second segment of the positional range.

3. The apparatus of claim 1, wherein the selected receiver signal is selected from a set of non-inverted receiver signals and inverted receiver signals.

4. The apparatus of claim 1, wherein the output signal has a substantially linear dependence on part position over the positional range,
    the output voltage being adjusted by an adjustment value according to the segment of the positional range.

5. The apparatus of claim 1, wherein the signal conditioner includes a logic unit comprising a digital electronic circuit, segment information being stored in the logic unit.

6. The apparatus of claim 5, wherein the output voltage is adjusted by an adjustment voltage, the adjustment voltage being generated by a digital-to-analog converter according to the segment information stored in the logic unit.

7. The apparatus of claim 5, wherein the signal conditioner further includes a selector, the selector selecting a receiver signal according to the segment information stored in the logic unit.

8. The apparatus of claim 5, wherein segment information is determined from a comparison of receiver signals.

9. The apparatus of claim 5, wherein calibration data is storable in the logic unit,
    the calibration data being used to modify the output signal to a desired form.

10. The apparatus of claim 9, wherein the signal conditioner further includes a calibration digital-to-analog converter, receiving calibration data stored in the logic unit and generating a voltage adjustment applied to the output voltage.

11. The apparatus of claim 1, wherein the plurality of receiver coils are substantially coplanar.

12. The apparatus of claim 11, wherein the plurality of receiver coils and the reference coil are formed on a single circuit board.

13. The apparatus of claim 1, wherein the single circuit board further supports an analog ASIC, the analog ASIC including the analog divider and phase sensitive rectifiers for each receiver signal and the reference signal.

14. The apparatus of claim 1, wherein the part position is an angular position, the coupler element rotating about a coupler axis.

15. The apparatus of claim 1, wherein the positional range is a rotation of theta degrees, the output signal having a sawtooth dependence on rotation angle with a period of theta degrees.

16. The apparatus of claim 15, wherein theta is 360.

17. The apparatus of claim 14, wherein the part position is a position of a pedal, movement of the pedal being mechanically coupled to the angular position of the coupler element.

18. The apparatus of claim 17, wherein the output signal is a speed control for an engine.

19. An apparatus for providing an output signal correlated with a part position for a moveable part, the part position having a positional range, the apparatus comprising:

a transmitter coil, the transmitter coil generating electromagnetic radiation when excited by an exciter signal;

a first receiver coil providing a first receiver signal;

a second receiver coil producing a second receiver signal;

a coupler element, having a coupler element position correlated with the part position, the an inductive coupling between the transmitter coil and each receiver coil being sensitive to the coupler element position; and a reference coil, providing a reference signal substantially independent of the coupler element position; and a signal conditioner, receiving the first and second receiver signals and providing an output signal correlated with the position of the moveable part, the output signal being derived from the first receiver signal over a first segment of the positional range, and from the second receiver signal over a second segment of the positional range.

20. The apparatus of claim 19, wherein the first receiver signal has a substantially linear dependence on part position over the first segment, the second receiver signal having a substantially linear dependence on part position over the second segment.

21. The apparatus of claim 19, wherein the first and second receiver coils are configured so that the first and second receiver signals are approximately 90 degrees out of phase.

22. The apparatus of claim 19, wherein the output signal is derived from the first receiver signal over a first segment of the positional range, from the second receiver signal over a second segment of the positional range, from an inverted first receiver signal over a third segment of the positional range, and from an inverted second receiver signal over a fourth segment of the positional range.

23. The apparatus of claim 19, wherein the first and second receiver coils, the reference coil, and the signal conditioner are formed on a single printed circuit board.

24. The apparatus of claim 1, wherein the signal conditioner includes a logic unit that keeps track of segment information using a memory stack, selection of the receiver signal depending on the segment information.

25. A method of determining the position of a moveable part, the method comprising:

exciting a transmitter coil;

obtaining a plurality of receiver signals from a plurality of receiver coils;

selecting a chosen receiver signal according to the approximate position of the moveable part;

obtaining a reference signal substantially independent of the position of the moveable part, the reference signal and the chosen receiver signal being subject to common noise factors;

dividing the selected receiver signal by the reference signal in an analog divider circuit to provide a ratiometric signal so as to eliminate the common noise factors; and determining the position of the moveable part using the ratiometric signal.

26. The method of claim 25, selecting a receiver signal according to the approximate position of the moveable part comprises selecting a receiver signal from which an output signal having a substantially linear dependence on position can be determined, the approximate position being part of a positional range of the moveable part.

* * * * *

UNITED STATES PATENT AND TRADEMARK OFFICE
CERTIFICATE OF CORRECTION

| | | |
|---|---|---|
| PATENT NO. | : 7,221,154 B2 | Page 1 of 1 |
| APPLICATION NO. | : 11/399150 | |
| DATED | : May 22, 2007 | |
| INVENTOR(S) | : Joong K. Lee | |

It is certified that error appears in the above-identified patent and that said Letters Patent is hereby corrected as shown below:

Column 6, line 47, replace "$D_1$" with --$D_1$--

Column 9, line 52, replace "36o" with --360--

Column 15, line 20, delete "an"

Signed and Sealed this

Thirty-first Day of July, 2007

JON W. DUDAS
*Director of the United States Patent and Trademark Office*